March 9, 1943.  E. V. BOREL  2,313,217
ELECTRIC FURNACE FOR MELTING GLASS
Original Filed Aug. 10, 1937
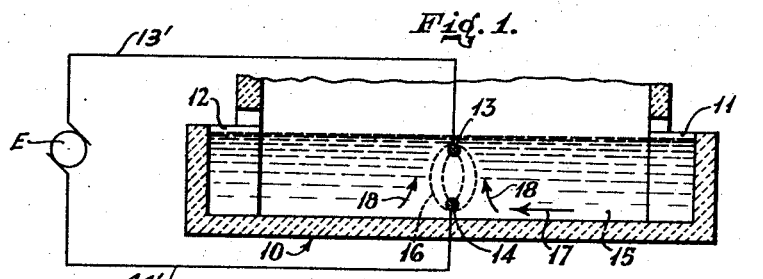
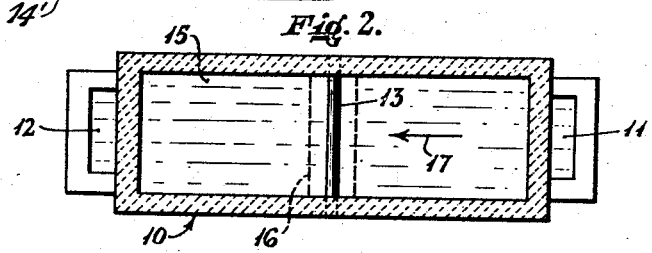
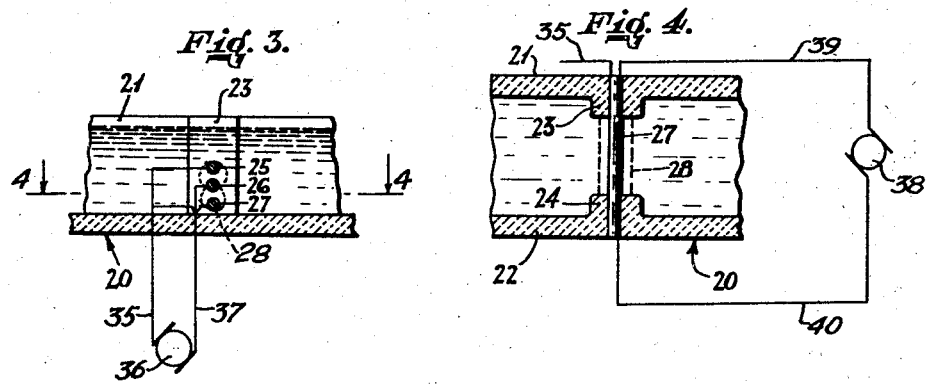
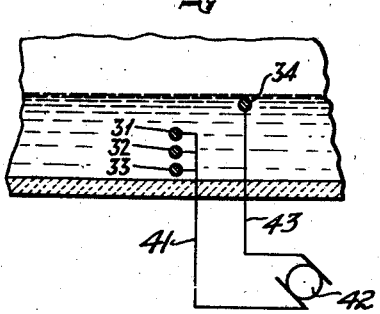
INVENTOR.
EDOUARD VIRGILE BOREL
BY
ATTORNEYS Patented Mar. 9, 1943

2,313,217

UNITED STATES PATENT OFFICE 2,313,217

ELECTRIC FURNACE FOR MELTING GLASS

Edouard Virgile Borel, Romont, Switzerland, assignor to Societe Anonyme des Manufactures des Glaces & Produits Chimiques de Saint-Gobain, Chauny & Cirey, Paris, France Original application August 10, 1937, Serial No. 158,347. Divided and this application May 22, 1940, Serial No. 336,547. In Germany August 14, 1936

10 Claims. (Cl. 13—6)

This invention relates to electric furnaces for making glass and refers more particularly to the heating of a glass mass in tank furnaces in which there is a continuous flow of the glass mass from one end of the furnace to the other end, and in which the glass mass is heated by an electrical current flowing through the glass mass which acts as a resistance, so that it is heated by the Joule effect of the electrical current.

The present invention is a division of my copending patent application, Serial No. 158,347, filed August 10, 1937, now Patent No. 2,225,616, relating to an electric furnace for melting glass.

In tank furnaces used for the continuous manufacture of glass articles of all types, raw materials are introduced into one end of the furnace and the glass mass is caused to flow from that end of the furnace to the opposite end, while being maintained at a substantially constant level, glass in the finished state being continuously removed from the opposite end of the furnace.

Vitreous materials in different stages of chemical composition are maintained at different temperatures in different parts of the furnace. Thus, there is a section at one end of the furnace where the raw materials are melted, an intermediate portion where molten glass is raised to a higher temperature for fining, and a section at the opposite end of the furnace in which the glass is cooled down to a temperature suitable for the purpose for which the glass is required. For example the temperature may be less than 1000° C. in the input zone, may be raised to as high as 1450° C. in the fining section and may be as low as 1200° C. at the section where glass is removed from the furnace.

The portions of a furnace in which the glass is maintained at different temperatures are sometimes partially separated by means of dams of refractory materials, but, in any case, they may conveniently be termed compartments.

By reason of the different temperatures in the different compartments of the furnace, and the fact that the density of glass varies with its temperature and is a different one at different stages of its manufacture, there is a continuous circulation of glass in the tank between the hotter and the cooler portions of the glass mass. Convection currents are set up in the glass, which are liable to mix unfined glass with the glass which has already been fined and render difficult the maintenance of the desired temperatures in the different compartments.

An object of the present invention is to control the circulation of the glass mass and the formation of convection currents.

Other objects of the present invention will become apparent in the course of the following specification.

The objects of the present invention may be realized by providing a combined mechanical and thermal barrier across the direction of the glass flow at any desired point along the length of the furnace, where it is desired to separate one compartment from another. This barrier consists of one or more electrodes for supplying electric current to the glass, of the type described in the aforesaid patent application, so located as to obstruct a horizontal convection current in the glass flowing along the length of the furnace, the electrode, or at least one of the electrodes, being located near the bottom of the tank furnace. The objects of the invention may also be realized by forming a hot zone in the glass surrounding the barrier, which zone extends substantially across the width of the furnace and is substantially hotter than the glass outside the said zone before and after the barrier, to produce rising currents of glass close to the barrier. The latter may be constituted by a plurality of electrodes of different polarities, or by a single electrode consisting of one or more elements of one polarity, while the other coacting electrode or electrodes of different polarity is or are situated elsewhere in the furnace.

A plurality of electrodes may be arranged to constitute the barrier and to form a hot zone by placing electrodes of different polarities one above the other, so that the greater part of the power supplied by the electrodes is expended in a narrow zone containing the electrodes. Alternatively, the barrier may be formed by a single electrode which sets up a relatively small high-intensity heat zone close to it, said zone extending within the glass mass across the entire width of the furnace. In order to form such a hot zone, it is necessary that the density of the electrical current flowing between electrodes be much greater in the neighbourhood of the electrode constituting the barrier than in more distant zones located between the electrodes. This is accomplished by using an electrode of an elongated rod-like form having a surface of contact with the glass which is comparatively small in comparison to the cross-sectional area of the glass bath between the electrodes. The single electrode constituting the barrier may be formed of one or several rod-like elements having the same polarity, the other co-acting electrode of different polarity being situated elsewhere in the furnace.

The invention will appear more clearly from the following detailed description when taken in connection with the accompanying drawing showing, by way of example, preferred embodiments of the inventive idea.

In the drawing:

Figure 1 is a vertical section through a furnace constructed in accordance with the principles of the present invention.

Figure 2 is a horizontal section through the furnace shown in Figure 1.

Figure 3 is a vertical section through a part of a different furnace.

Figure 4 is a horizontal section through the furnace shown in Figure 3, the section being taken substantially on line 4—4 of Figure 3; and Figure 5 shows in vertical section a furnace having a different arrangement of electrodes.

The furnace 10 shown in Figs. 1 and 2 comprises an opening 11 through which raw materials are introduced into the furnace and an opening 12 through which the finished glass is removed from the furnace. Two electrodes 13 and 14, having the form of elongated rod-like elements, are situated within the glass mass 15 and extend one above the other across the entire width of the furnace, forming a mechanical and thermic barrier obstructing the flow of glass from one portion of the furnace on one side of them to the portion on the other side of them.

The two electrodes 13 and 14 are of different polarity since they are connected to different poles of a source of electric energy E by means of leads 13' and 14', respectively. The electrical current flows through the glass mass from one electrode to the other as indicated by the lines 16.

The different portions or divisions of tank 10 in which the various process steps, such as melting and fining the glass mass, take place are not indicated in the drawing.

When the furnace is in operation, raw materials are continuously supplied to the furnace through the opening 11, while finished glass is removed through the opening 12, so that there is a continuous flow of the glass mass 15 through the furnace in the direction of the arrow 17 from the opening 11 toward the opening 12, but besides this flow this is a circulatory flow of glass along the furnace due to convection currents which ordinarily is much more rapid.

The electrodes 13 and 14 constitute a combined mechanical and thermal barrier which obstructs such a rapid flow from one section of the furnace to the other, while permitting a necessary slow flow.

A hot zone of the glass mass is formed in the narrow transverse zone which comprises the electrodes 13 and 14 and thus, rising currents are set up in the glass mass as indicated by the arrows 18. Any horizontal currents tending to flow from one compartment to the other are diverted by these rising currents and are thereby restricted.

The furnace 20, parts of which are shown in Figs. 3 and 4, comprises side walls 21 and 22 having projecting portions 23 and 24 which restrict the width of the furnace. Electrodes 25, 26 and 27 are placed vertically one above the other and extend across this restricted section of the furnace.

The electrodes 25, 26 and 27 are of different polarity. Then the electrical current will flow from one electrode to another as indicated by the lines 28 in Fig. 3. For example, electrodes 25 and 27 may be connected by a lead 35 to one terminal of a suitable source of electrical energy 36 and electrode 26 may be connected by a lead 37 to the other terminal of said source.

The electrodes 25, 26 and 27 constitute a mechanical and thermic barrier which operates in a manner similar to that of the electrodes shown in Figs. 1 and 2.

Furthermore, in accordance with the present invention the heat concentrated around the electrode may be further increased by using the electrode itself as a resistance, applying to it another electrical current which, instead of flowing from that electrode to the glass, flows from one end to the other of said electrode. To this end, electrode 27, for example, may have the opposite ends thereof connected to unlike terminals of a suitable source of electrical energy 38 by means of leads 39 and 40 (Fig. 4) in addition to the connection thereof to source 36 (Fig. 3).

When the electrodes form a dam or screen used to prevent the exchange of horizontal currents of glass between the various sections of the tank, it is often sufficient to have the electrical current flowing through the electrodes in the manner of resistors without the current passing from one electrode to another one through the glass. In other words, sources of electrical energy 36 and 38 may be employed together or separately in connection with the same or different electrodes.

The furnace shown in Figure 5 of the drawing is provided with three parallel rod-like current-transmitting elements 31, 32 and 33, which are all connected by a lead 41 to one pole of a source of electrical energy 42, so that they constitute elements of a single electrode. The other pole of the source of electrical energy may be connected by a conductor 43 to an electrode 34 which is spaced from the composite electrode 31, 32, 33 in the longitudinal direction of the furnace, i. e. in the direction of the glass flow. When the surface of contact of the composite electrode 31, 32, 33 with the glass is smaller than the cross sectional area of the glass bath between said electrode and the co-acting electrode 34, the density of the electrical current flowing between the electrodes is considerably greater in the zones around this composite electrode than in other sections of the furnace situated between the electrodes. Thus, comparatively small high-intensity heat zones are formed around the electrodes 31, 32, 33. The hot zone which includes the elements 31, 32 and 33 of an electrode will constitute an effective thermic barrier preventing the rapid flow of horizontal convection currents from one compartment to the other while permitting the necessary slow flow and furthering the formation of upwardly rising currents which facilitate the heat treatment of the glass mass. It is also possible to connect the electrodes 31, 32 and 33 to different terminals of the source 42 so that the electrical current will flow between these electrodes.

One of the advantages of the constructions shown in Figs. 3, 4 and 5 is that the effect of the dam constituted by the electrodes upon the glass mass may be regulated by merely regulating the electrical current. If it is desired that currents of glass should flow more freely between the melting compartment, for example, and the other compartments of the tank furnace, it is merely necessary to interrupt electric current supplied to the electrodes 31, 32 and 33 without actually removing them. The electrodes are bodily situated in the path of the glass flow and form a material obstacle to the flow of the glass longitudinally of the furnace by reducing the cross-sectional passage area available to the glass.

It is apparent that the specific illustrations shown above have been given by way of illustration and not by way of limitation, and that the structures above described are subject to wide variation and modification without departing from the scope or intent of the invention. All of such variations and modifications are to be included within the scope of the present invention.

What is claimed is:

1. In a tank furnace for treating glass, wherein the materials to be treated are introduced at one end of the tank and glass in the finished state is removed from the opposite end of the tank, the combination therewith of electrodes to supply electric current to the glass mass, a combined mechanical and thermal barrier extending within the glass mass and across the direction of its flow, said barrier comprising at least one electrode completely immersed in the glass mass and extending substantially across the entire width of said flow between the points of insertion of the materials to be treated and of removal of the glass and near the bottom of the tank to obstruct a horizontal convection current flowing along the length of the furnace in the glass mass, said electrode having a surface of contact with the glass such as to set up a relatively small hot zone in the glass mass close to the electrode, said zone being substantially hotter than the glass outside of said zone to produce rising currents within the glass mass close to the barrier.

2. In a tank furnace for treating glass, wherein a mass of glass in different states of chemical composition is maintained at a substantially constant level, the materials to be treated being introduced at one end of the tank and glass in the finished state being removed from the opposite end of the tank, the combination therewith of a plurality of electrodes of different polarity completely immersed in the glass mass, said electrodes extending in the flow path of the glass mass between the points of insertion of the materials to be treated and of removal of the glass and across the entire width of the glass flow, and being placed one above the other and substantially in the same vertical plane so as to form a hot zone in the glass mass extending across substantially the entire width of the glass flow which is hotter than the glass outside the said zone to produce rising currents within the glass mass.

3. In a tank furnace for treating glass, wherein the materials to be treated are introduced at one end of the tank and glass in the finished state is removed from the opposite end of the tank, the combination therewith of electrodes to supply electric current to the glass mass, a combined mechanical and thermal barrier extending within the glass mass and across the direction of its flow, said barrier comprising at least two rod-like electrodes of different polarity completely immersed in the glass mass situated one above the other and extending substantially across the entire width of said glass flow between the points of insertion of the materials to be treated and of removal of the glass to obstruct a horizontal convection current flowing along the length of the furnace in the glass mass, at least one of the electrodes being situated near the bottom of the tank.

4. In a tank furnace for electrically treating glass, wherein the material to be treated is introduced at one end of the tank and glass in the finished state is removed from the opposite end of the tank, the combination therewith of electrodes immersed in the glass mass to supply electric current to said mass, at least one of the electrodes being composed of a plurality of parallel elements extending one above the other in a vertical plane and connected to the same electrical pole, at least one of said elements being situated close to the bottom of the tank, said elements being completely immersed and arranged in and across the flow path of the glass mass between the points of insertion of the materials to be treated and of removal of the glass and extending over the whole width of the glass flow so as to form a combined mechanical and thermal barrier to obstruct a horizontal convection current in the glass flowing along the length of the furnace and by forming a hot zone in the glass surrounding the barrier to produce rising currents of glass close to the barrier.

5. In apparatus for treating glass, a container having an inlet for insertion of materials to be treated and an outlet for the removal of glass wherein the treated materials flow primarily in a horizontal direction from said inlet to said outlet, a plurality of electrodes in said container, and means connecting said electrodes to a source of electrical energy whereby current is caused to flow through the glass between said electrodes, at least one of said electrodes being mounted in said container between said inlet and outlet and wholly below the surface of the glass bath and surrounded thereby so that the glass may flow above and below the same, said last-named electrode extending across substantially the entire width of said container adjacent the bottom thereof.

6. In a refractory glass making furnace of the continuous flow type wherein flow of the glass is primarily in a horizontal direction from an inlet adjacent one end of the furnace to an outlet adjacent the other end thereof, an electrical rod-like resistor mounted in said furnace with the longitudinal axis thereof extending transversely of the direction of flow of the glass, and means for connecting said resistor to a source of electrical energy whereby the same is heated by flow of electrical current therethrough, said resistor extending across substantially the entire width of said furnace adjacent the bottom thereof between the point of insertion of the glass making materials and the point of removal of the glass and wholly below the surface of the glass bath, so that the latter may surround and flow above and below the same.

7. In a glass making furnace of the continuous flow type, a refractory container having an inlet adjacent one end thereof for the insertion of glass making materials and an outlet adjacent the other end thereof for removal of the glass, the flow of the contents of the container being primarily in a horizontal direction from said inlet to said outlet, an elongated electrical conductor in said container having high electrical resistance, and means connecting said conductor to a source of electrical energy whereby current is caused to flow therethrough and heat the same, said conductor being mounted in said container between said inlet and said outlet and wholly below the surface of and surrounded by the contents of said container so that said contents may flow above and below the same, said conductor extending across substantially the entire width of the container with the longitudinal axis thereof extending transversely of the direction of flow of said contents.

8. In apparatus for treating glass wherein a glass mass in different states of chemical composition is maintained at a substantially constant level, a container having an inlet adjacent one end thereof for the insertion of glass making materials to be treated and an outlet adjacent the other end thereof for the removal of glass wherein the treated materials flow primarily in a horizontal direction from said inlet to said outlet, a plurality of elongated elements extending across the entire width of the container and mounted therein adjacent each other substantially in vertical alignment between said inlet and outlet and wholly below the surface of and surrounded by the glass mass so that the latter may flow above and below the same, the lowermost of said elements being adjacent the bottom of the container.

9. In a glass making furnace of the continuous flow type, a refractory container having an inlet adjacent one end thereof for the insertion of glass making materials and an outlet adjacent the other end thereof for removal of the glass wherein the treated materials flow primarily in a horizontal direction from said inlet to said outlet, and means for controlling the flow of the glass bath between said inlet and outlet, said means including an elongated element mounted in the container and extending across the entire width of the container adjacent the bottom thereof between said inlet and outlet and wholly below the surface of the glass bath and surrounded thereby so that the latter may flow above and below the same, the longitudinal axis of said element extending transversely of the flow path of said bath.

10. In apparatus for treating glass wherein a glass mass in different stages of treatment is maintained at a substantially constant level, a container having an inlet adjacent one end thereof for the insertion of materials to be treated and an outlet adjacent the other end thereof for the removal of finished glass, the width of said container being restricted at at least one place between said inlet and outlet by refractory projections on the inner walls thereof, a plurality of electrodes in said container, and means connecting said electrodes to a source of electrical energy, at least one of said electrodes being mounted in and extending across substantially the entire width of the restricted portion of said container wholly below the surface of the glass mass so the latter may flow above and below the same.

EDOUARD VIRGILE BOREL.